(12) United States Patent
Guha et al.

(10) Patent No.: US 9,406,009 B2
(45) Date of Patent: *Aug. 2, 2016

(54) METHOD AND APPARATUS TO TAG METAL

(71) Applicant: International Business Machines Corporation, Armonk, NY (US)

(72) Inventors: Supratik Guha, Chappaqua, NY (US); Yves C. Martin, Ossining, NY (US); Theodore G. van Kessel, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,650

(22) Filed: Dec. 14, 2012

(65) Prior Publication Data

US 2014/0166752 A1    Jun. 19, 2014

(51) Int. Cl.
| | |
|---|---|
| *G06K 19/06* | (2006.01) |
| *G06K 7/01* | (2006.01) |
| *G06K 19/063* | (2006.01) |
| *B21C 37/06* | (2006.01) |
| *B21C 51/00* | (2006.01) |

(52) U.S. Cl.
CPC ............ *G06K 19/06* (2013.01); *B21C 37/06* (2013.01); *B21C 51/005* (2013.01); *G06K 7/01* (2013.01); *G06K 19/063* (2013.01); *G06K 19/06121* (2013.01)

(58) Field of Classification Search
CPC ...... E02D 33/00; G06K 17/00; G06K 7/0008; G06K 13/08; G06K 19/06; G06K 19/06121; G06K 19/063; G06K 7/01; G01M 5/00; G01M 5/0041; G01L 5/0004; F16H 59/105; G01D 5/147; B23K 26/0009; B23K 26/0087; B23K 26/034; B21C 51/005; B21C 37/06; G01N 21/89; B27C 1/14; C23C 4/16; G01B 5/061; G06F 19/00
USPC .................................................. 235/383, 439
See application file for complete search history.

(56) References Cited

U.S. PATENT DOCUMENTS

| | | | |
|---|---|---|---|
| 4,202,490 | A | 5/1980 | Gunkel et al. |
| 4,578,891 | A | 4/1986 | Murray |
| 4,701,869 | A | 10/1987 | Callegari, Sr. et al. |
| 4,847,552 | A | 7/1989 | Howard |

(Continued)

FOREIGN PATENT DOCUMENTS

| | | | |
|---|---|---|---|
| DE | 19808951 A1 | * | 9/1999 |
| KR | 20090070214 | * | 7/2009 |

OTHER PUBLICATIONS

B. Abu-Nabah, et al., "The Effect of Hardness on Eddy Current Residual Stress Profiling in Shot-Peened Nickel Alloys," Journal of Nondestructive Evaluation, vol. 29, No. 3, 2010, pp. 143-153.

(Continued)

*Primary Examiner* — Sonji Johnson
(74) *Attorney, Agent, or Firm* — Cantor Colburn LLP; Vazken Alexanian

(57) ABSTRACT

A method of tagging an article is disclosed. Data that identifies the article is encoded into at least one stress value. A stress region having a stress that corresponds to the at least one stress value is created in a surface of the article to the tag the article. The at least one stress value is read by a measurement device to read the data and identify the article.

20 Claims, 4 Drawing Sheets

(56) References Cited

U.S. PATENT DOCUMENTS

| | | | |
|---|---|---|---|
| 5,149,948 A * | 9/1992 | Chisholm | 235/462.06 |
| 5,835,477 A * | 11/1998 | Binnig | B82Y 10/00 |
| | | | 369/126 |
| 5,898,302 A | 4/1999 | Soules | |
| 6,370,107 B1 * | 4/2002 | Hosaka | G11B 5/82 |
| | | | 369/275.3 |
| 6,473,361 B1 * | 10/2002 | Chen | B81B 3/0054 |
| | | | 365/151 |
| 6,625,515 B2 | 9/2003 | Kerr et al. | |
| 6,720,764 B2 | 4/2004 | Relton et al. | |
| 8,016,037 B2 | 9/2011 | Bloom et al. | |
| 2002/0131297 A1 * | 9/2002 | Baumeister | B82Y 10/00 |
| | | | 365/174 |
| 2003/0015011 A1 * | 1/2003 | Koyama et al. | 72/31.1 |
| 2003/0201320 A1 * | 10/2003 | Venkatesh et al. | 235/383 |
| 2005/0150944 A1 * | 7/2005 | Melick et al. | 235/375 |
| 2005/0185567 A1 * | 8/2005 | Adelmann | B82Y 10/00 |
| | | | 369/126 |
| 2006/0206236 A1 * | 9/2006 | Smyth | 700/225 |
| 2007/0164264 A1 * | 7/2007 | Lenssen | B82Y 10/00 |
| | | | 257/1 |
| 2009/0043228 A1 * | 2/2009 | Northrop et al. | 600/585 |
| 2009/0090786 A1 * | 4/2009 | Hovis | 235/494 |
| 2009/0099675 A1 * | 4/2009 | Staroselsky et al. | 700/97 |
| 2009/0125143 A1 * | 5/2009 | Bajocich | G06K 1/05 |
| | | | 700/186 |
| 2009/0216361 A1 * | 8/2009 | Tanida | 700/159 |
| 2010/0142076 A1 * | 6/2010 | Bandic | B82Y 10/00 |
| | | | 360/48 |
| 2010/0247133 A1 * | 9/2010 | Sugahara | 399/81 |
| 2011/0166685 A1 * | 7/2011 | Suzuki et al. | 700/103 |
| 2013/0015236 A1 * | 1/2013 | Porter et al. | 235/375 |

OTHER PUBLICATIONS

D. Barac, et al., "Advances in Eddy Current Measurement of Residual Stress," The 7th International Conference on Shot Peening, ICSP-7, 1999, pp. 326-335.

M. Felisberto, et al., "Automatic Detection of Pipeline Components in Radiographs for Corrosion Monitoring," 2006 International Pipeline Conference, Sep. 25-29, 2006, Paper No. IPC2006-10462, pp. 705-710.

S. Hillmann, et al., "Near-Surface Residual Stress-Profiling with High Frequency Eddy Current Conductivity Measurement," Proceedings of the 35th Annual Review of Progress in Quantitative Nondestructive Evaluation. AIP Conference Proceedings, vol. 1096, 2009, pp. 1349-1355.

H. Schoenekess, et al., "Method of Determine Tensile Stress Alterations in Prestressing Steel Strands by Means of an Eddy-Current Technique," IEEE Sensors Journal, vol. 7, Issue 8, Aug. 2007, pp. 1200-1205.

* cited by examiner

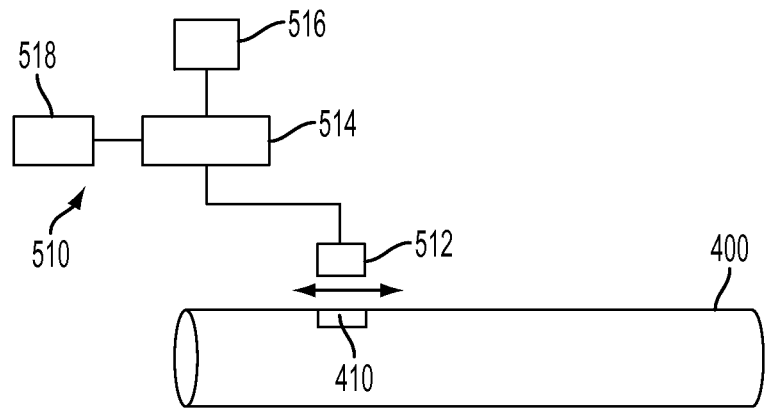
FIG. 5
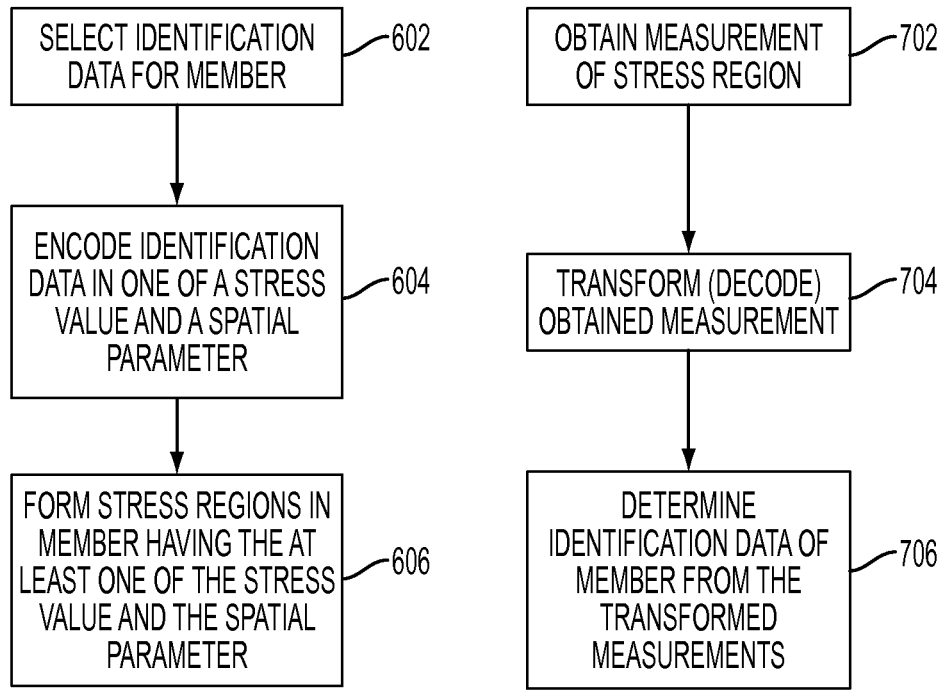
FIG. 6
FIG. 7

US 9,406,009 B2

METHOD AND APPARATUS TO TAG METAL

BACKGROUND

The present disclosure relates to methods of tagging a member, and more specifically, to methods of encoding data in the member using a stress formed in the member.

Various industrial applications require the use of high-quality large metal parts, such as high-quality steel pipes, for example. Producing such high-quality parts involves considerable expertise and expense to metal manufacturers. Many of the parts so produced are mission-critical in that failure can lead to loss of life, property and damage to the environment. It is therefore desirable to be able to identify these parts in manufacturing through the supply chain and in the field. Further, counterfeiters are falsely marketing low-quality metal parts as high-quality parts, thereby undercutting legitimate manufacturers and providing inferior products to the work place. In order to satisfy tracking needs and thwart the actions of counterfeiters, manufacturers mark their products with identification tags placed on a surface of the metal part. However, current tagging methods are ineffective or unfeasible because the tags are easily forged and because these metal parts, steel pipes, etc. are often used in environments that may erode, corrode or abrade the surface of the metallic objects, thereby destroying the tag.

SUMMARY

According to one embodiment of the present disclosure, a method of tagging an article includes: encoding data identifying the article into at least one stress value; and creating a stress region at a surface of the article to the tag the article, wherein the stress region includes a stress that corresponds to the at least one stress value that encodes the data.

According to another embodiment of the present disclosure, a method of identifying an article includes: creating a stress region in the article, wherein a stress value in the stress region corresponds to encoded data that provides identification of the article; and reading the stress value to identify the article.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

FIG. 5 shows an exemplary reading device for identifying a member from a tag formed therein using the exemplary methods disclosed herein;

FIG. 6 shows a flowchart illustrating an exemplary method of tagging an article or member;

FIG. 7 shows a flowchart illustrating an exemplary method of identifying the article or member from the one or more stress regions formed therein.

DETAILED DESCRIPTION

Figure 1:
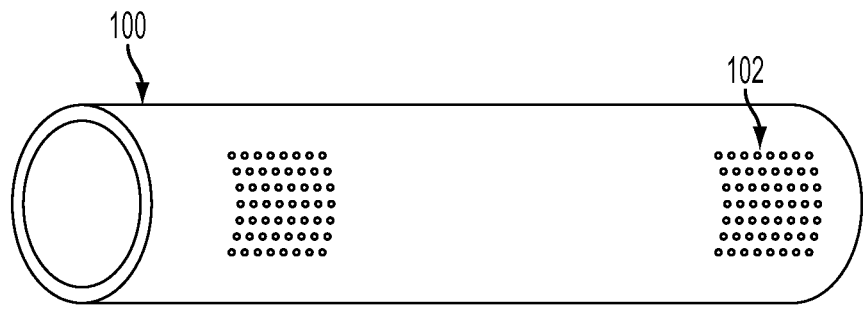
FIG. 1 shows an exemplary member that may be tagged using the exemplary methods disclosed herein.

FIG. 1 shows an exemplary member 100 that may be tagged using the exemplary methods disclosed herein. In an exemplary embodiment, the member 100 is a metallic member that may include steel pipes, large metal products, large metal castings, forging, extrusions, metallic parts of high value, etc. The methods disclosed herein may be used to tag metallic members so as to be readable once the member is disposed in an environment that corrodes or abrades surface features.

In one embodiment, member 100 includes an exemplary pattern 102 formed therein. The pattern 102 may extend in either one or two spatial dimensions along the surface of the member 100. The exemplary pattern may include one or more created stress regions, also referred to herein as stress volumes, having stresses that are formed by a tagging device, wherein a value of a stress in a stress region identifies the member 100. A stress value in the stress regions may vary measurably from a stress in a region that does not include the pattern, i.e., the residual stress of the member after a production process. The stress value may be a magnitude of stress, a stress profile in the stress region, etc. We note that in the discussion herein, stress and strain are related and quantities in that a material under stress has an associated strain and a measurement of stress relates to a corresponding measurement of strain. When we refer to a stress region, we assert an understanding that there is an associated strain in that region. An exemplary stress region may be created by forming a strain or an impression in the surface or other subsurface perturbation, such as a groove, a crater, a hole, a cavity, etc. In one embodiment, the stress value may be related to a depth of the impression. In one embodiment, the tagging device may be a peening device that is controlled to apply a peening force to form one or more impressions in a selected pattern with an associated stress. Alternatively, the tagging device may be a welding tool or other heating device that is controlled to create one or more stress regions in a selected pattern by varying a temperature parameter of a heating tool and a quench rate. In such a tool, a local material strain or crystal transition may be frozen in place in multiple applications to form a pattern. Other tools for forming a stress region in the member but that are not specifically disclosed herein may nonetheless be used in different embodiments. The stress or impression may extend from a surface of a selected depth. The exemplary tagging devices may form the stress region to extend below a depth at which normal wear occurs on the metallic member. Stress regions may include stress-creating features as a slip dislocation, a stacking fault, a grain boundary shift and alloy composition variations.

In an exemplary embodiment, the pattern 102 is a tag or mark that identifies the member 100. Data that identifies the member 100 may be encoded into the pattern using, for example, a stress value of the pattern 102. Additionally, the identification data may be encoded by a spatial frequency of the pattern, i.e., a relative placement of the stress regions, or a variation in the spatial frequency of the pattern. The magnitude of the stress may be related to a depth to which the stress region extends below a surface of the member. In various aspects, the identification data is encoded in the pattern. Once read, the data may be decoded by performing a convolution operation on the identification data. The identification data may include a serial number or other selected identification mark, for example. The data encoding method may include use of public key encryption. In various embodiments, the encoded data may include a hash code, or other method of encoding such as public key encryption.

Figure 2:
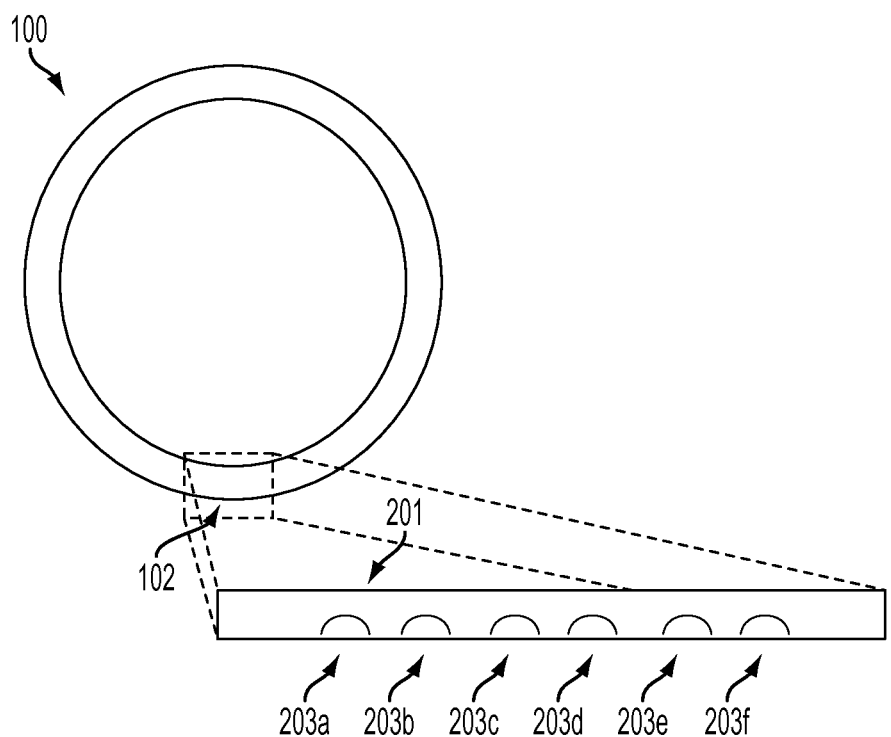
FIG. 2 shows a cross-sectional view of the exemplary member of FIG. 1.

FIG. 2 shows a cross-sectional view of the exemplary member 100 of FIG. 1. A close-up view of the pattern 102 of the member 100 shows a surface 201 having a series of impressions 203a, 203b, 203c, 203d, 203e and 203f formed therein. The impressions 203a, 203b, 203c, 203d, 203e and 203f extend to different depths within the member and therefore produce stress regions having different stress values Identification data may thus be encoded in the impression depth or the resulting stress value of the impression.

Figure 3:
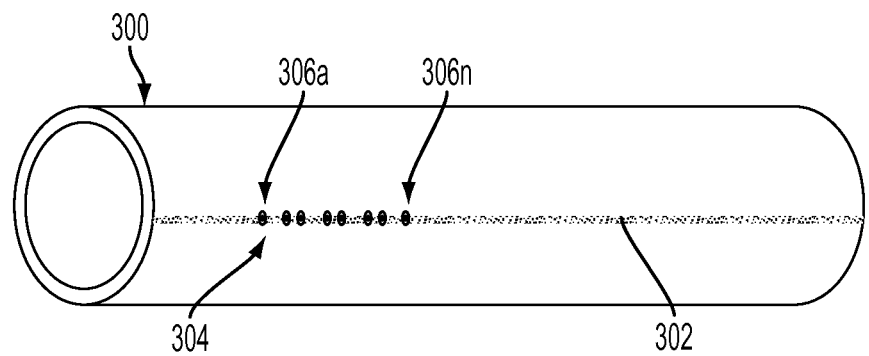
FIG. 3 shows an exemplary pattern formed in a member at a welded seam.

FIG. 3 shows an exemplary pattern 304 formed in a member 300 at a welded seam 302. The pattern 304 may be formed, for example, by varying a welding temperature of a welding tool and the quench rate, while forming the welded seam 302 in order to create one or more stress regions 306a-306n along the welded seam 302. The stress regions may include material and composition density variations in the welded seam 302 that form the stress regions 306a-306n. The stress regions 306a-306n may have a stress that is measurably different from a stress in an unmarked region of the welded seam 302. Identification data may be encoded in a magnitude of the stress in the stress region and the spacing or separation of the stress regions.

Figure 4:
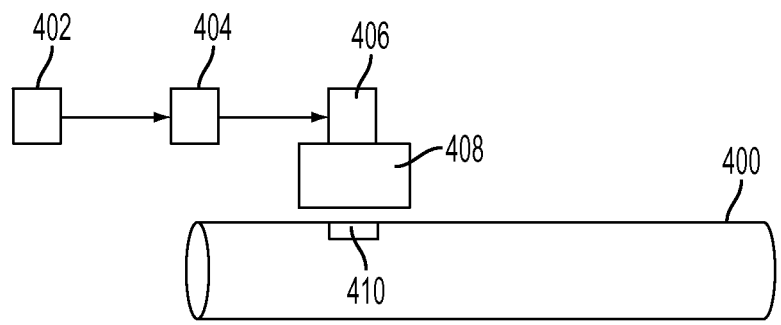
FIG. 4 shows an exemplary tagging device for tagging a member.

FIG. 4 shows an exemplary tagging device for tagging a member 400 according various embodiments. Identification data 402 is encoded to obtain encoded data 404. The encoded data 404 may be obtained by performing an operation on the identification data 402, such as convolution, etc. The encoded data 404 is then fed to controller 406 of a stress-forming device 408. The controller 406 controls a parameter of the stress-forming device 408 to form a stress region or pattern 410 in the member 400 that corresponds to the encoded data 404 and thus to the identification data 402.

FIG. 5 shows an exemplary reading device 510 for identifying a member from a tag formed therein using the exemplary methods disclosed herein. In various embodiments, a reading device may be selective to detecting either a stress or a strain. The exemplary apparatus 510 includes a measurement tool 512 or scanning device for obtaining a measurement of the stress region or pattern 410. In an exemplary embodiment, the obtained measurement is a measurement of a stress value as well as a spatial parameter of the pattern 410. In an exemplary embodiment, the measurement tool 512 is a non-destructive tool such as an ultrasonic measurement tool, an eddy current measurement tool, a tool for obtaining a magnetic measurement, and an X-ray measurement tool such as an X-ray diffraction tool, for example. In various embodiments, eddy current measurements may be combined with ultrasound measurements. Both measurement eddy current measurement devices and ultrasound measurement devices may be portable to a member location. Thus, the patterns may be scanned at the member location. In one embodiment, the measurement tool 512 may obtain a measurement of stress without contacting the surface of the member 400.

The exemplary reading device 510 may further includes a processor 514 and the obtained measurements may be sent from the measurement tool 512 to the processor 514. The processor 514 may access a set of programs 516 suitable for performing a decoding process on the obtained measurements to determine an identification or tag number of the member. In one embodiment, the programs 516 may perform various transformations, such as a Fourier transforms, on the obtained measurements. Additionally, the processor 514 may remove noise from the transformed measurements prior to performing identification of the member. The processor 514 may further have access to a memory or database 518. The database 518 may include a table providing a cross reference between an identification number and a transform. The processor 514 may thus compare the transformed measurements to a transform stored in the database 518 to determine the identification of the member 400.

FIG. 6 shows a flowchart illustrating an exemplary method of tagging an article or member. In box 602, identification data for the article or member is selected. In box 604, the identification data is transformed into encoded data, wherein the encoded data includes a stress parameter and/or a pattern of stress regions. In various embodiments, the identification data may undergo a mathematical convolution operation to obtain the encoded data. In box 606, a stress-forming instrument is used to form one or more stress regions in the article or member that encodes the data in the member via the stress parameter and/or pattern determined in box 604.

FIG. 7 shows a flowchart illustrating an exemplary method of identifying the article or member from the one or more stress regions formed therein. In box 702, a measurement tool obtains a measurement that is indicative of the stress formed in the stress region and/or a spatial arrangement of a plurality of stress regions. In box 704, a processor performs an operation to transform the obtained measurements from box 702 into a set of transformed data. In various embodiments, the transformation operation is a Fourier transform. Noise, generally due to surface wear or corrosion, may be removed from the Fourier spectrum. In box 706, the transformed data may be compared to a table of transform data to determine the identification of the article or member.

Figure 8:
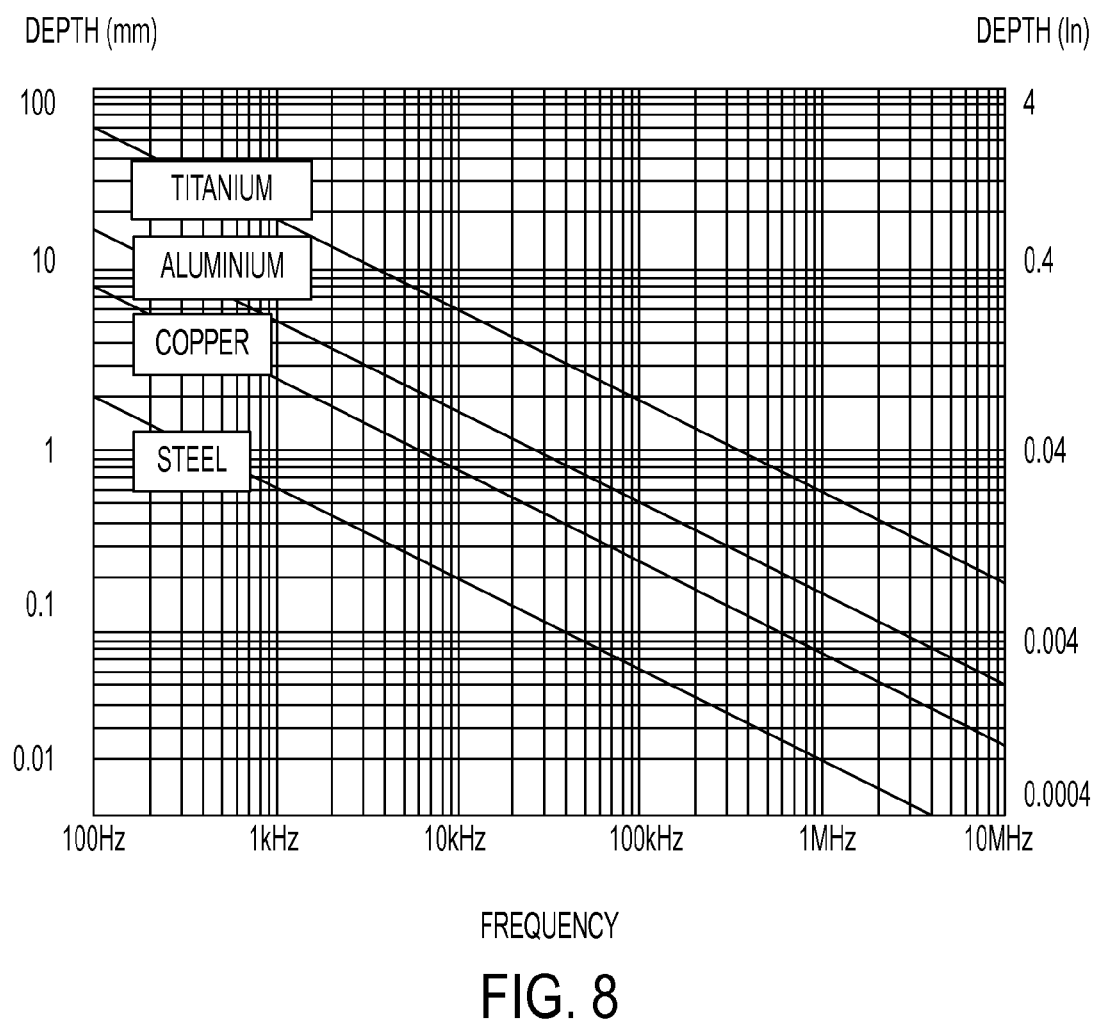
FIG. 8 shows an exemplary chart of eddy current imaging sensitivity.

FIG. 8 shows an exemplary chart 800 of eddy current imaging sensitivity. Eddy current measurements measure a current that results from the stress regions of the pattern. Eddy current measurements are particularly suited to penetrate to at least millimeter depths. The exemplary chart 800 may be used with an eddy current measurement device to select an eddy current measurement frequency suitable for reading a pattern. For example, for steel, a scanning frequency of 1 kilohertz may be used to read patterns with a sensitivity to impressions formed to about 0.4 mm below a surface of the member and a scanning frequency of 1 Megahertz may be used to read patterns with a sensitivity to impressions formed to about 0.02 mm below a surface of the member. Depth sensitivity may also depend on a metallic composition of the member, as seen by exemplary sensitivity lines for steel, copper, aluminum and titanium.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the exemplary embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of tagging an article, comprising:
   selecting identification data for the article;
   encoding the selected identification data as at least one stress magnitude; and creating a stress region on a welded seam of the article and directly into a surface of the article tagging the article,
   wherein the stress region includes an impression that produces the at least one stress magnitude in the article, wherein the at least one stress magnitude in the stress region is read identifying the article using a measurement tool that is portable to a location of the article.

2. The method of claim 1, further comprising creating a plurality of stress regions directly into the surface of the article forming a pattern, wherein the selected identification data is further encoded in stress magnitudes of the plurality of stress regions and a property of the pattern.

3. The method of claim 2, wherein the property of the pattern is one of a variation in a spatial frequency of the plurality of stress regions and a spacing of the plurality of stress regions.

4. The method of claim 1, wherein creating the stress region further comprises peening the article with a controlled force.

5. The method of claim 1, wherein creating the stress region further comprises controlling a temperature of a tool applying heat to the article.

6. The method of claim 1, wherein the created stress region extends into the article to a depth below a depth of an expected wear on the article.

7. The method of claim 1, wherein encoding the selected identification data obtaining the at least one stress magnitude further comprises performing a convolution operation on the selected identification data.

8. The method of claim 1 wherein encoding the selected identification data includes using at least one of a hash code and public key encryption.

9. The method of claim 1, wherein the at least one stress region includes at least one of grain boundaries, slip defects, inclusion defects, stacking defects, and alloy stoichiometric variations.

10. A method of identifying an article, comprising:
    selecting identification data for the article;
        encoding the selected identification data as at least one stress value;
        creating a stress region on a welded seam of the article and directly into the article that includes an impression that produces the at least one stress magnitude in the article, wherein the at least one stress magnitude in the stress region provides identification of the article; and
    using a measurement tool portable to the article reading a magnetic field indicative of the at least one stress magnitude to identify the article.

11. The method of claim 10, further comprising creating a plurality of stress regions having a plurality of stress magnitudes directly into the surface of the article, wherein the selected identification data is encoded via the plurality of stress magnitudes and a property of the pattern.

12. The method of claim 11, wherein the property of the pattern further comprises at least one of a variation of a spatial frequency of the plurality of stress regions in the pattern and a spacing between the plurality of stress regions in the pattern.

13. The method of claim 11, wherein the pattern is one of a one-dimensional pattern and a two-dimensional pattern.

14. The method of claim 10, further comprising creating the stress region using at least one of controlling a force applied to the article by a peening device and a controlling a temperature of a welding device applied to the article.

15. The method of claim 10, wherein reading the magnetic field further comprises obtaining a measurement of the stress region that is at least one of: an ultrasonic measurement, an eddy current measurement, a magnetic measurement and an X-ray measurement.

16. The method of claim 15, further comprising performing a Fourier transform on the obtained measurement.

17. The method of claim 16, further comprising extracting noise from the obtained measurement via the Fourier transform.

18. The method of claim 10, wherein encoding the selected identification data includes using a convolution operation on the selected identification data.

19. The method of claim 10, wherein encoding the selected identification data includes using at least one of a hash code and public key encryption.

20. The method of claim 10, wherein reading the magnetic field indicative of the at least one stress magnitude to identify the article further comprises measuring an eddy current resulting from the at least one stress magnitude in the article to identify the article.

* * * * *